(12) United States Patent
Smith

(10) Patent No.: US 10,838,554 B2
(45) Date of Patent: Nov. 17, 2020

(54) TOUCH SCREEN DISPLAY ASSEMBLY AND METHOD OF OPERATING VEHICLE HAVING SAME

(71) Applicant: GE Aviation Systems Limited, Gloucestershire (GB)

(72) Inventor: Mark Andrew Smith, Cheltenham (GB)

(73) Assignee: GE AVIATION SYSTEMS LIMITED, Cheltenham (GB)

( * ) Notice: Subject to any disclaimer, the term of this patent is extended or adjusted under 35 U.S.C. 154(b) by 0 days.

(21) Appl. No.: 16/561,871

(22) Filed: Sep. 5, 2019

(65) Prior Publication Data

US 2020/0081603 A1   Mar. 12, 2020

(30) Foreign Application Priority Data

Sep. 11, 2018 (GB) .................................. 1814726.4

(51) Int. Cl.
| | |
|---|---|
| G06F 3/041 | (2006.01) |
| G06F 3/044 | (2006.01) |
| G06F 3/0488 | (2013.01) |
| B64D 43/00 | (2006.01) |
| G06F 3/0485 | (2013.01) |

(52) U.S. Cl.
CPC ......... G06F 3/04186 (2019.05); B64D 43/00 (2013.01); G06F 3/044 (2013.01); G06F 3/04883 (2013.01); G06F 3/0485 (2013.01); G06F 2203/04104 (2013.01); G06F 2203/04108 (2013.01); G06F 2203/04808 (2013.01)

(58) Field of Classification Search
CPC .................................................. G06F 3/04186
See application file for complete search history.

(56) References Cited

U.S. PATENT DOCUMENTS

| | | | |
|---|---|---|---|
| 7,394,453 B2 | 7/2008 | Woolley | |
| 7,656,393 B2 | 2/2010 | King | |
| 8,963,846 B2 | 2/2015 | Lii | |
| 9,395,852 B2 | 7/2016 | Clifton | |
| 9,785,331 B2 | 10/2017 | Telang | |
| 9,870,093 B2 | 1/2018 | Gannon | |
| 9,898,129 B1 * | 2/2018 | Connelly | ................ G06F 3/045 |
| 9,916,028 B2 | 3/2018 | Hao | |
| 9,971,436 B2 | 5/2018 | Peana | |
| 2002/0167704 A1 * | 11/2002 | Kleinhans | ............ H03K 17/962 |
| | | | 398/175 |
| 2006/0238517 A1 | 10/2006 | King et al. | |
| 2010/0141603 A1 | 6/2010 | Hotelling | |

(Continued)

FOREIGN PATENT DOCUMENTS

| | | |
|---|---|---|
| EP | 2455843 A2 | 5/2012 |
| EP | 3246810 A1 | 11/2017 |
| WO | 2016102296 A2 | 6/2016 |

OTHER PUBLICATIONS

European Patent Office, European Search Report re Application No. 19195324.9-1216, Jan. 27, 2020, 13 pages, Munich, Germany.

*Primary Examiner* — Matthew Yeung
(74) *Attorney, Agent, or Firm* — McGarry Bair PC

(57) ABSTRACT

A touch screen display assembly can include a touch sensitive screen having a screen surface, and at least one hand anchor located adjacent the screen surface. The at least one hand anchor can also be configured to form a stabilizing feature when a user interacts with the touch sensitive screen.

19 Claims, 7 Drawing Sheets

(56) References Cited

U.S. PATENT DOCUMENTS

| | | | |
|---|---|---|---|
| 2012/0105335 A1* | 5/2012 | Suddreth | G06F 1/1601 |
| | | | 345/173 |
| 2012/0127115 A1 | 5/2012 | Gannon | |
| 2013/0234929 A1* | 9/2013 | Libin | G06F 3/0488 |
| | | | 345/156 |
| 2014/0107871 A1* | 4/2014 | Williams | G01C 21/3664 |
| | | | 701/3 |
| 2014/0317722 A1 | 10/2014 | Tartz et al. | |
| 2016/0011685 A1 | 1/2016 | Suddreth | |
| 2016/0054822 A1* | 2/2016 | Suzuki | G06F 3/0488 |
| | | | 345/173 |
| 2017/0075392 A1 | 3/2017 | Erdogan | |
| 2017/0371486 A1 | 12/2017 | Neiswander et al. | |

* cited by examiner

TOUCH SCREEN DISPLAY ASSEMBLY AND METHOD OF OPERATING VEHICLE HAVING SAME

CROSS REFERENCE TO RELATED APPLICATION(S)

This application claims the benefit of British Application No. 1814726.4 filed Sep. 11, 2018, titled "Touch Screen Display Assembly and Method of Operating Vehicle Having Same," which is incorporated herein by reference in its entirety.

BACKGROUND

Contemporary aircraft cockpits include a flight deck having multiple flight displays, which may display to the flight crew a wide range of aircraft, flight, navigation, and other information used in the operation and control of the aircraft. The multiple flight displays may include touch screens to control various features of the aircraft. During periods of heavy turbulence, vibrations are created in the aircraft as a whole making it difficult to touch the touch screen in the desired manner or location.

Current touch screen displays can include a physical stabilization device such as a palm or wrist rest. Touch screen displays having larger touch areas may be unable to be effectively utilized during periods of heavy turbulence if a user stabilizes their hand on the touch surface of the display. Such stabilization can generate an additional touch on the screen, which may result in an input that the user did not intend.

BRIEF DESCRIPTION

In one aspect, the disclosure relates to a touch screen display assembly. The touch screen display assembly can include a touch sensitive screen having a screen surface, at least one hand anchor located adjacent the screen surface and wherein the at least one hand anchor is configured to form a stabilizing feature when a user interacts with the touch sensitive screen, a touch sensor operably coupled to the at least one hand anchor and forming a touch sensitive area within at least a portion of the at least one hand anchor, the touch sensor includes a capacitive sensor configured to output a signal based on a touch within the touch sensitive area, and a controller configured to receive the signal and operate the touch sensitive screen based thereon.

In another aspect, the disclosure relates to a method of operating a vehicle having a touch screen display. The method includes outputting, from a touch sensor, a signal indicative of a touch on a hand anchor located adjacent a touch screen surface, detecting an input touch on the touch screen display, determining that the input touch is invalid based on the signal indicative of a touch on a hand anchor located adjacent a touch screen surface, and controlling operation of the touch screen display based on the determining.

DETAILED DESCRIPTION

The described aspects of the present disclosure are directed to a touch screen display assembly, which is illustrated in an exemplary environment of an aircraft. However, the disclosure is not so limited and can have general applicability in non-aircraft applications, such as other mobile applications and non-mobile industrial, commercial, and residential applications.

As used herein, it will be understood that "a set" of elements can include any number of the respective elements, including only one element. Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

As used herein, a "controller" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

Figure 1:
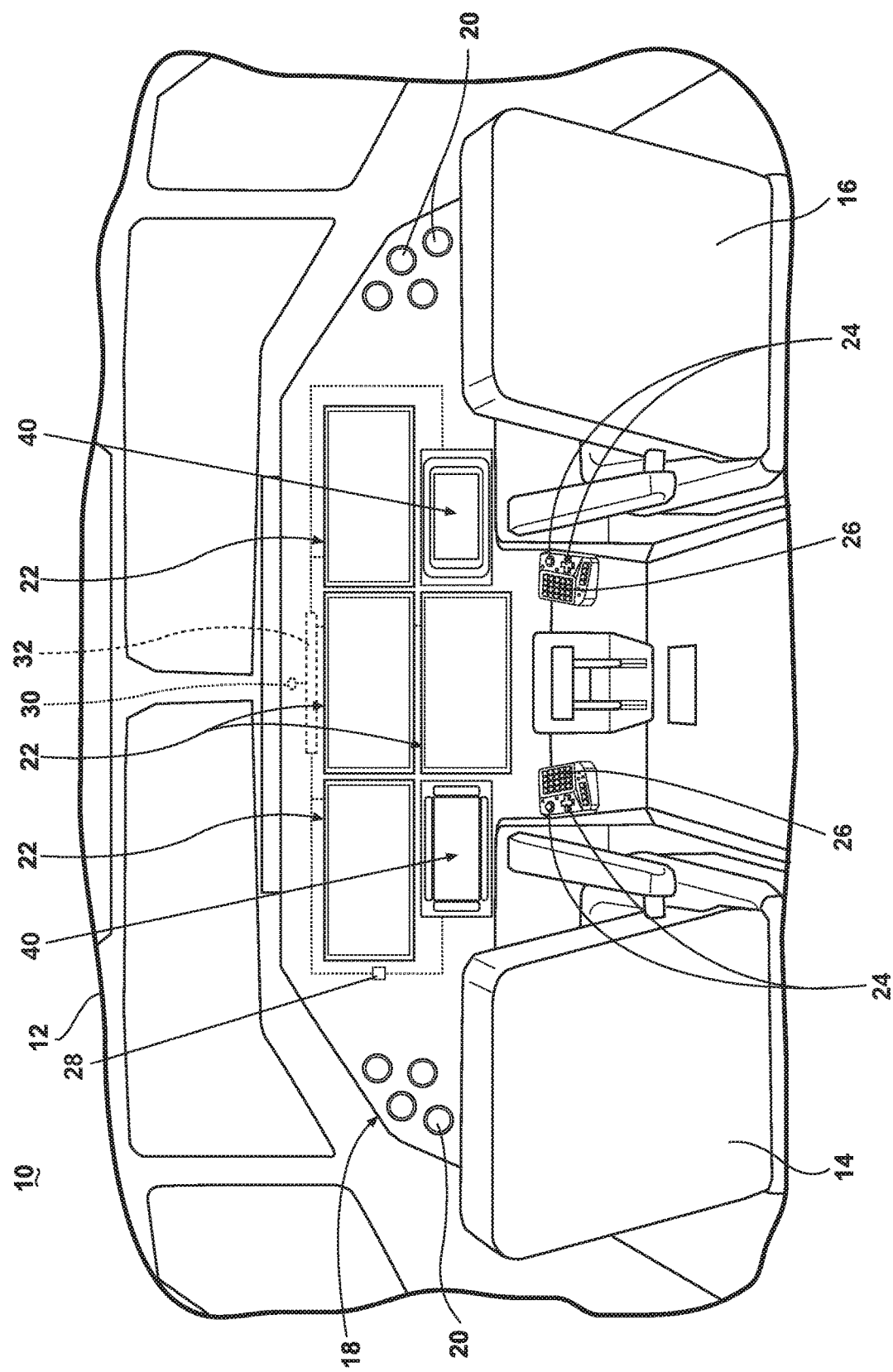
FIG. 1 is a perspective view of a portion of an aircraft cockpit with a flight deck having multiple touch screen displays according to various aspects described herein.

FIG. 1 illustrates a portion of an aircraft 10 having a cockpit 12. While a commercial aircraft has been illustrated, it is contemplated that the invention may be used in any type of aircraft, for example, without limitation, fixed-wing, rotating-wing, rocket, or personal aircraft. A first user (e.g., a pilot) may be present in a seat 14 at the left side of the cockpit 12 and another user (e.g., a co-pilot) may be present at the right side of the cockpit 12 in a seat 16. A flight deck 18 having various instruments 20 and multiple multifunction flight displays 22 may be located in front of the pilot and co-pilot and may provide the flight crew with information to aid in flying the aircraft 10. The flight displays 22 may include either primary flight displays or multi-function displays and may display a wide range of aircraft, flight, navigation, and other information used in the operation and control of the aircraft 10.

The flight displays 22 have been illustrated as being in a spaced, side-by-side arrangement with each other. The flight displays 22 may be laid out in any manner including having fewer or more displays. Further, the flight displays 22 need not be coplanar and need not be the same size. At least one touch screen display assembly 40 may be included in the flight display 22 and may be used by one or more flight crew members, including the pilot and co-pilot, to interact with the systems of the aircraft 10. Such touch screen display assembly 40 may include any suitable components including a liquid crystal display (LCD) and may use various physical or electrical attributes to sense inputs from the flight crew.

It is contemplated that one or more cursor control devices 24 and one or more multifunction keyboards 26 may be included in the cockpit 12 and may also be used by one or more flight crew members to interact with the systems of the aircraft 10. A suitable cursor control device 24 may include any device suitable to accept input from a user and to convert that input to a graphical position on any of the multiple flight displays 22. Various joysticks, multi-way rocker switches, mice, trackballs, and the like can be suitable for this purpose and each user can have separate cursor control device(s) 24 and keyboard(s) 26.

A turbulence sensor or detector 28 can be included within the aircraft 10. The turbulence detector 28 can be placed in any suitable location such as the cabin or storage area of the aircraft and has by way of non-limiting example been illustrated within the cockpit 12. The turbulence detector 28 can be any suitable mechanism for detecting turbulence including by way of non-limiting examples, a vertical accelerometer, a longitudinal accelerometer, a toroidal accelerometer, a vibration indicator, or any combination of the previous examples or equivalents thereof. The turbulence detector 28 can output a signal indicative of turbulence or output a signal that can be used to determine if turbulence is present.

A controller 30 can be operably coupled to components of the aircraft 10 including the flight displays 22, flight screen display assembly 40, cursor control devices 24, keyboards 26, and turbulence detector 28. The controller 30 can also be connected with other controllers or systems (not shown) of the aircraft 10. The controller 30 can include memory and processing units, which may be running any suitable programs to implement a graphical user interface (GUI) and operating system. These programs typically include a device driver that allows the user to perform functions on the touch screen display assembly 40 such as selecting and opening files, moving icons, selecting options, and inputting commands and other data through the touch screen display assembly 40.

The turbulence detector 28 can provide turbulence information to the controller 30 including that turbulence has been detected. Alternatively, the controller 30 can process the data output from the turbulence detector 28 and determine from the output that the aircraft 10 is experiencing turbulence. The controller 30 can also receive inputs from one or more other additional sensors (not shown), which can provide the controller 30 with various information to aid in the operation of the aircraft 10.

Figure 2:
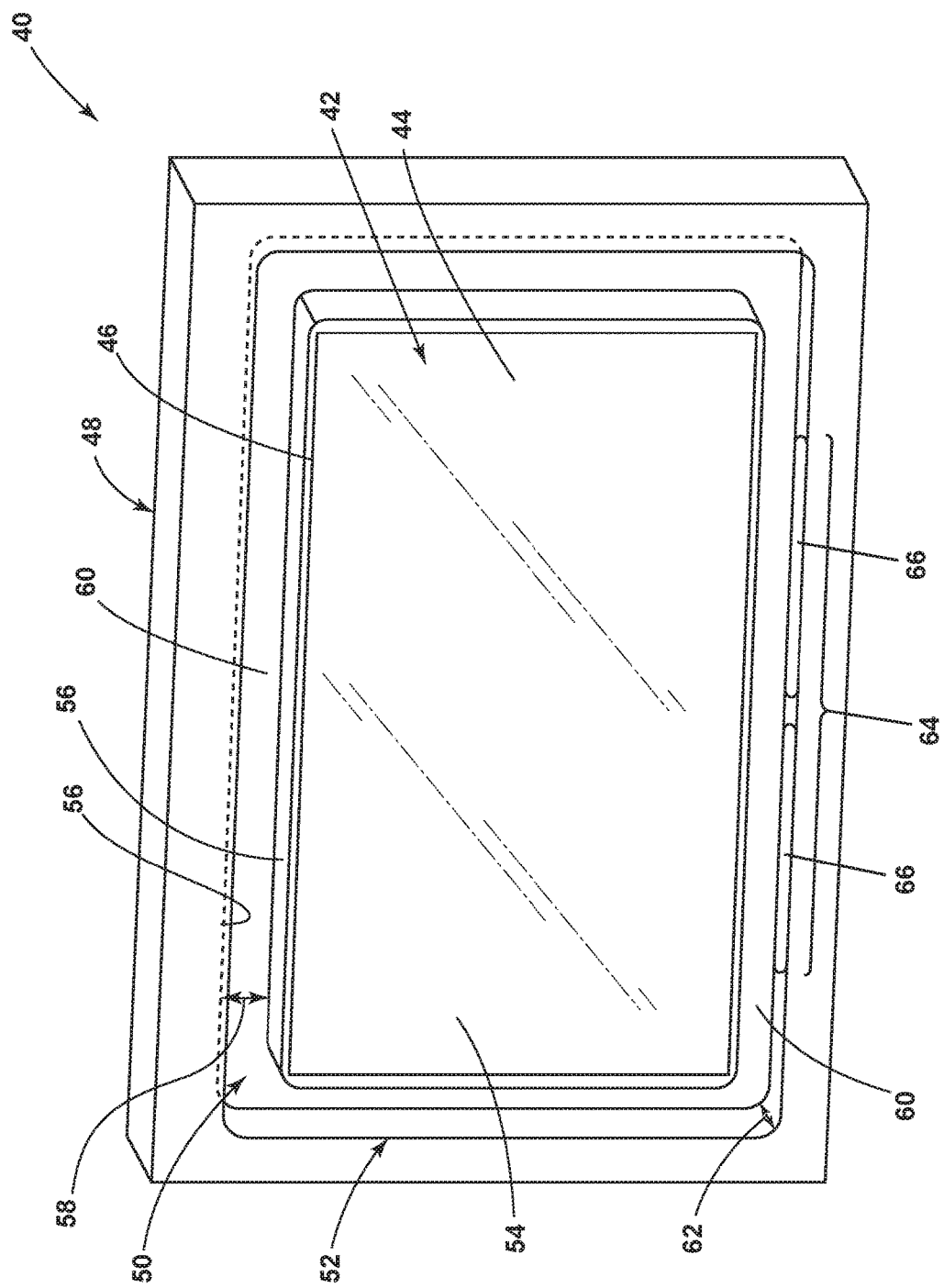
FIG. 2 is a perspective view of a touch screen display assembly according to various aspects described herein that can be utilized in the cockpit of FIG. 1.

FIG. 2 illustrates a perspective view of the touch screen display assembly 40 that can be included in the flight display 22 in the aircraft 10. The touch screen display assembly 40 can include a touch screen display or touch sensitive screen 42 having a screen surface 44 and a periphery 46. In the illustrated example, the touch sensitive screen 42 is positioned within a housing 48 surrounding the periphery 46. The housing 48 can be made of any suitable material including plastic, metal, or glass.

At least one hand anchor 50 can be included in the touch screen display assembly 40 and located adjacent the screen surface 44. As used herein, "hand anchor" will refer to any feature, non-limiting examples of which include a protuberance, recess, malleable feature, or a feature having an increased surface friction compared with its surroundings, wherein contact between at least a portion of a user's hand and the hand anchor can provide for stabilization of the user's hand during interaction with the touch screen display assembly 40. The hand anchor 50 can therefore be configured to form a stabilizing feature when a user interacts with the touch sensitive screen 42.

In the illustrated example, the hand anchor 50 can be located within the housing 48 adjacent the touch sensitive screen 42 and in the form of a slot or channel 52. It is contemplated that the hand anchor 50 can include a single slot or channel 52 extending about the periphery 46 and formed below a plane 54 defined by the screen surface 44. The channel 52 can be formed by spaced sidewalls 56 defining an opening width 58 as well as a rear surface 60 defining a depth 62 of the channel 52. In a non-limiting example, the rear surface 60 can be parallel to the plane 54 defined by the screen surface 44. It is also contemplated that the channel 52 can be configured to accommodate at least a portion of a user's finger. In a non-limiting example, the channel 52 can be in the form of a slot as described in GB Patent Application No. 1806288.5, filed Apr. 18, 2018, which is incorporated herein by reference in its entirety.

It is further contemplated that the hand anchor 50 can also include an illuminable portion 64. The illuminable portion 64 is illustrated as a set of light sources 66 disposed within the hand anchor 50, such as light-emitting-diodes (LEDs) or other suitable light sources, which can illuminate any or all of the hand anchor 50 including the rear surface 60 or sidewalls 56. Furthermore, while shown within a sidewall 56 it will be understood that the set of light sources 66 can be disposed anywhere within the hand anchor 50, including about any portion or the entirety of the periphery 46 or below the rear surface 60.

Figure 3:
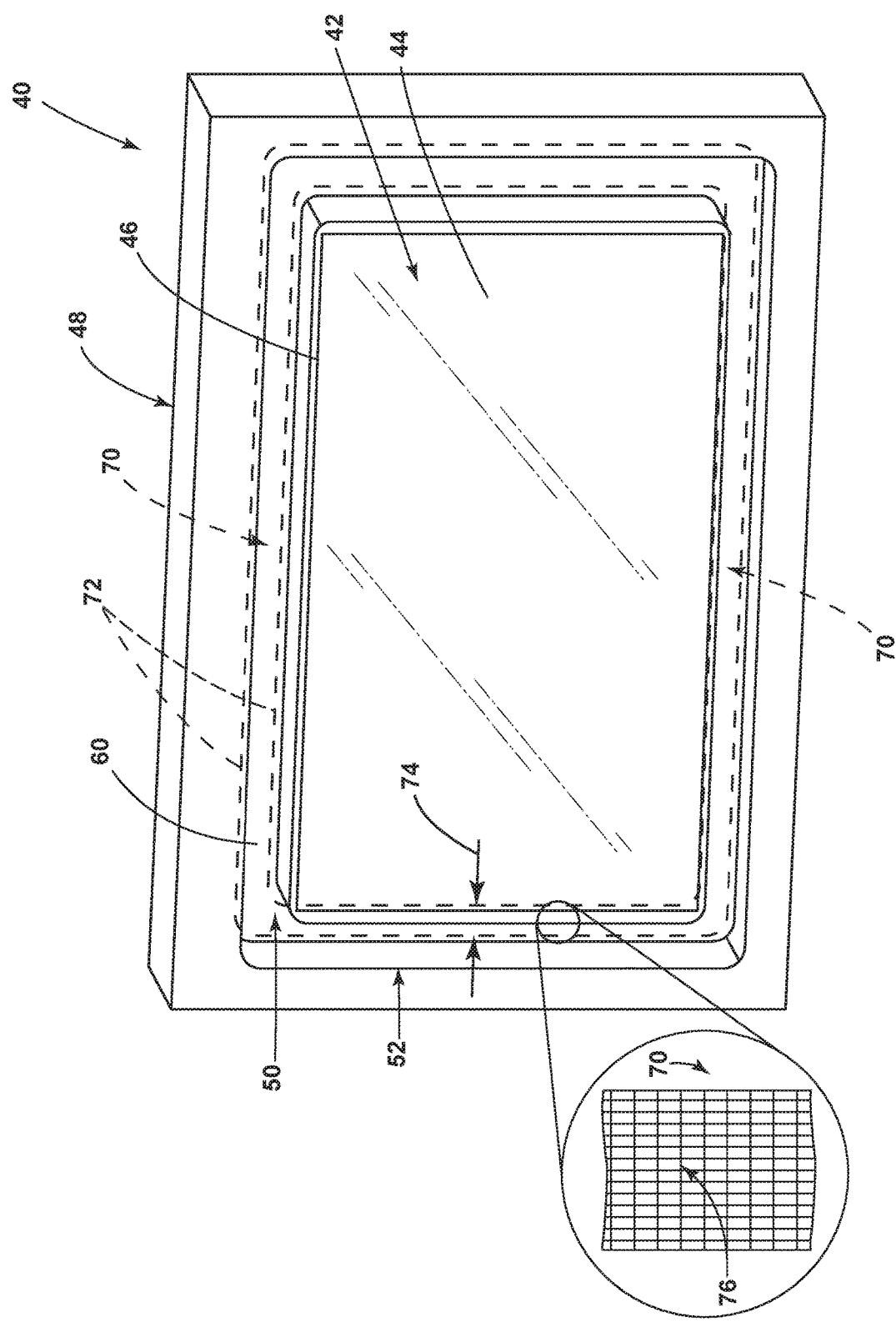
FIG. 3 is a perspective view of the touch screen display assembly of FIG. 2 illustrating a touch sensor according to various aspects described herein.

FIG. 3 illustrates that a touch sensor 70 can be operably coupled to the hand anchor 50. The touch sensor 70 can be included in the hand anchor 50 to form a touch sensitive area 72 within at least a portion of the hand anchor 50. As shown, the touch sensitive area 72 is located along the rear surface 60 of the channel 52 and extends along the entire periphery 46. Although this need not be the case, and the touch sensitive area can be a more limited area including a singular point within the hand anchor 50 or several singular points within the hand anchor 50. It is also contemplated that the touch sensitive area 72 of the touch sensor 70 can extend along a continuous portion of the rear surface 60 about a portion less than the entirety of the periphery 46. Further, while the touch sensitive area 72 is illustrated as having a width 74 less than the opening width 58 of the channel 52 it is contemplated that the entire rear surface 60, including the full opening width 58 across the rear surface 60, can be included within the touch sensitive area 72. Alternatively, only the center most portion of the rear surface 60 can form the touch sensitive area 72.

An enlarged portion of a portion of the touch sensor 70 is illustrated. It is contemplated that the touch sensor 70 can include any suitable sensor, such as a capacitive touch sensor or capacitive array 76 of sensors, for sensing or detecting a touch on the touch sensitive screen 42. It will also be understood that other sensor types, including resistive touch sensors, can be utilized in the touch sensor 70.

Figure 4:
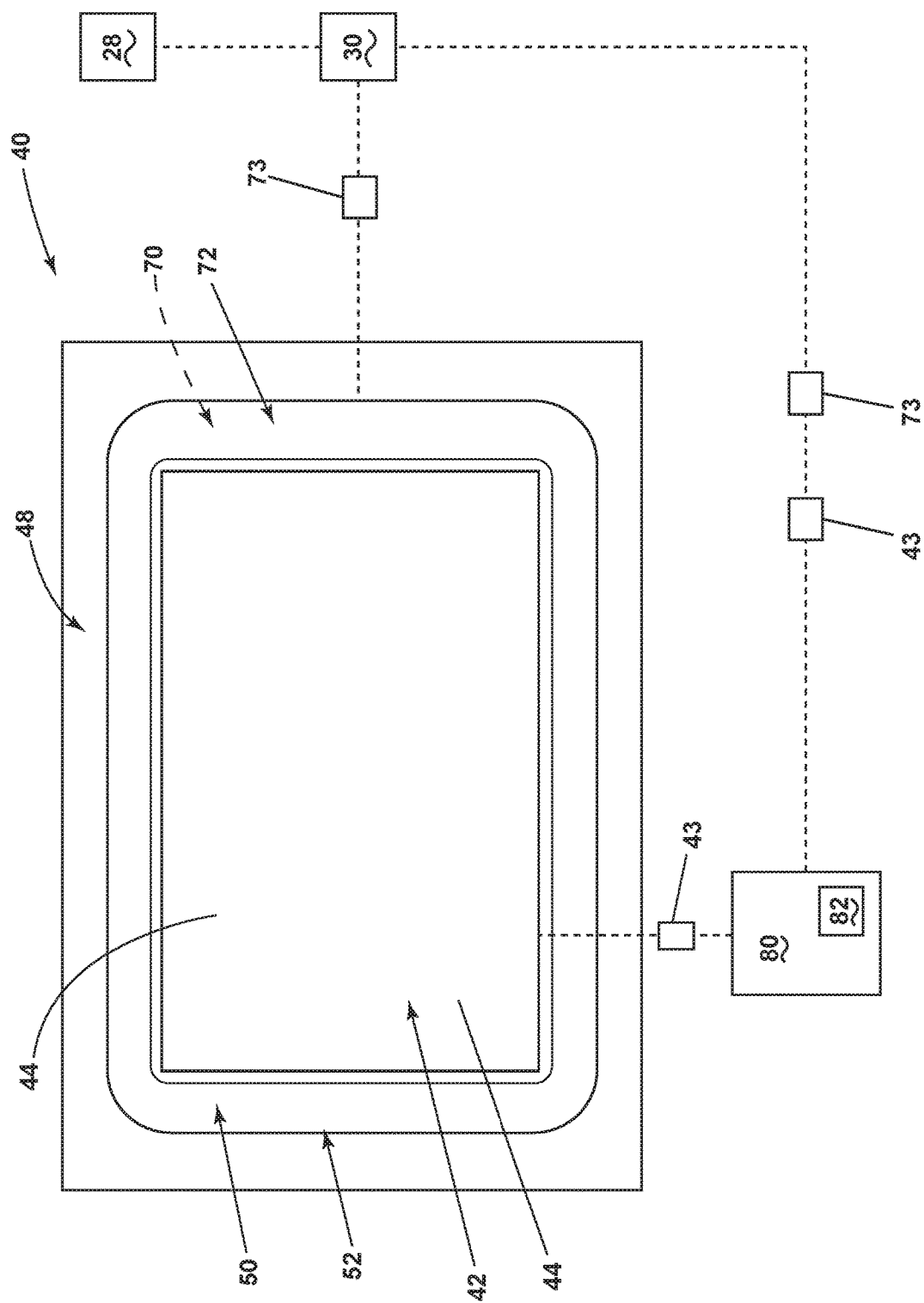
FIG. 4 is a schematic view of the touch screen display assembly of FIG. 2 communicatively connected to a controller and a display module according to various aspects described herein.

Turning to FIG. 4, the touch screen display assembly 40 is schematically illustrated in communication with the controller 30. More specifically, the touch sensor 70 (including any included capacitive array 76) can be configured to output a signal 73 based on a touch within the touch sensitive area 72. In addition, it is contemplated that a "touch or "input touch" can refer to physical contact between a user and a touch sensor, such as a user's finger contacting the touch sensor 70 or touch sensitive screen 42. Alternately "touch" or "input touch" can refer to a user's hand, finger, or thumb "hovering over" or being located adjacent but not touching the touch sensor 70 or touch sensitive screen 42; in other words, having a sufficiently close physical proximity between a user and touch sensor to generate a signal indicative of an input touch, such as the signal 73 or the screen signal 43. For example, the touch sensor 70 can be configured to generate the signal 73 when a user "hovers" or holds a finger within a predetermined distance of the touch sensor 70. One non-limiting example of such a predetermined distance can be 5 mm or smaller; another non-limiting example can be 10 mm or greater. In another example, the touch sensitive screen 42 can be configured to generate the screen signal 43 when a user holds a finger or thumb within 5 mm of the touch sensitive screen 42 for a time duration longer than 1 second. In still another example, the touch sensitive screen 42 or touch sensor 70 can be configured to generate the respective screen signal 43 and signal 73 only upon direct contact with a user's fingers, thumb, hand, or wrist. The controller 30 can be configured to receive the signal 73 from the touch sensor 70 and operate the touch sensitive screen 42 based thereon.

A display module 80 can also be included in the touch screen display assembly 40. While illustrated externally, it is contemplated that the display module 80 can be located within the touch screen display assembly 40, such as within the housing 48 or beneath the touch sensitive screen 42. The display module 80 can be configured to receive a screen signal 43 from the touch sensitive screen 42 based on a user touch on the touch sensitive screen 42.

A recognition module 82 can also be included in the touch screen display assembly 40 and communicatively connected to at least one of the display module 80, the touch sensor 70, or the controller 30. In the example shown, the recognition module 82 is included with the display module 80; in other non-limiting examples, the recognition module 82 can be a separate or distinct component from the display module 80, or located in another aircraft system such as the controller 30. The recognition module 82 can be configured to receive the signal 73 from the touch sensor 70 or the screen signal 43 from the display module 80.

During operation of the aircraft 10 (FIG. 1), a display with at least one display element (such as the display element 120 of FIG. 6) can be presented on the touch sensitive screen 42. A user can rest a portion of their hand on or within the hand anchor 50 for stabilization, and the user can enter an input touch or gesture on either or both of the touch sensitive screen 42 or the touch sensor 70. An input touch or gesture performed on the touch sensor 70 can be received as the signal 73 by the controller 30 (FIG. 4).

It is contemplated that either or both of the signal 73 and the screen signal 43 can include information about position, such as "X-Y" position data on the touch sensor 70 or touch sensitive screen 42, as well as a timestamp corresponding to each position. Such position data can be mapped to the appropriate boundaries of the touch sensor 70 or touch sensitive screen 42. Changes in position, including rates of change of position, can be determined based on the corresponding timestamp.

The recognition module 82 (FIG. 4) can determine that an input touch or gesture has been performed and communicate the determination to the controller 30. In addition, the controller 30 can determine that an input touch or gesture is inadvertent. The controller 30 can then operate the touch sensitive screen 42 based on the determination of a valid input touch, a valid gesture, an inadvertent input touch, or an inadvertent gesture. For example, the controller 30 can update a display on the touch sensitive screen 42 based on the determination, such as moving a screen element in response to a valid gesture determination, or leaving a menu option display visible in response to an inadvertent input touch that would otherwise close the menu option display. It is further contemplated that the controller 30 can automatically operate the touch sensitive screen 42 based on the determination.

For example, the controller 30 can output the signal 73 from the touch sensor 70 to the recognition module 82, and the display module 80 can output the screen signal 43 to the recognition module 82. In another example, the controller 30 can receive the screen signal 43 from the display module 80 and operate the touch sensitive screen 42 based thereon. In this manner, the controller 30 can be configured to receive input from the screen surface 44 of the touch sensitive screen 42.

It is contemplated that a user can use a fingertip to write, tap, swipe, or provide other types of input on the touch sensitive screen 42 or touch sensor 70. The user may also inadvertently touch the touch sensitive screen 42 with other portions of their palm, hand, or wrist while providing fingertip input to the touch sensitive screen 42. For example, during turbulent conditions of the aircraft 10, including during such conditions as determined by the turbulence detector 28 (FIG. 2), the user may steady their hand or wrist on the hand anchor 50 in order to make an accurate input touch with their fingertip.

Based on the signal 73 or the screen signal 43, the recognition module 82 can be configured to determine a gesture on at least one of the touch sensitive area 72 or the touch sensitive screen 42. For example, the signal 73 from the touch sensor 70 can indicate that an input touch has moved across the capacitive array 76, and the recognition module 82 can determine that a swiping gesture has been performed on the touch sensor 70.

It is also contemplated that the controller 30 can determine that an input touch is invalid or inadvertent, such as input touches not provided by a user's fingertip. The determination of invalid or inadvertent touches can be made in a multitude of ways, and it is contemplated that such determinations can also be based on one or more characteristics of the input touch itself either alone or in combination with turbulence being detected.

In another non-limiting example, the screen signal 43 can indicate that multiple input touches have occurred on the touch sensitive screen 42, and the recognition module 82 can determine that at least one of the multiple input touches are inadvertent based on position and timestamp data. In still another example, the signal 73 and screen signal 43 can be utilized in combination by at least one of the controller 30 or recognition module 82 to determine that a gesture or an inadvertent touch has occurred.

Figure 5:
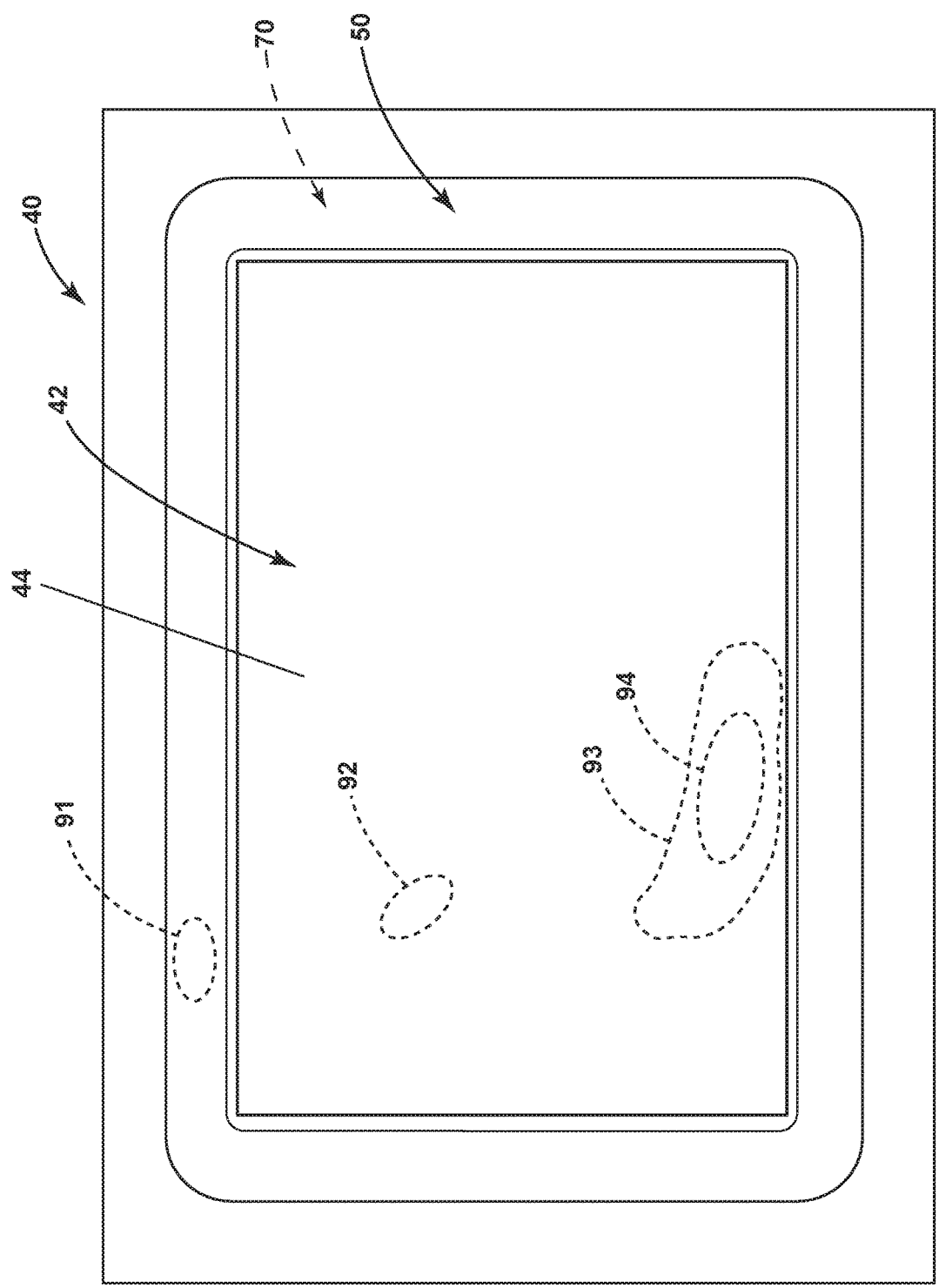
FIG. 5 is a schematic view of the touch screen display assembly of FIG. 2 with multiple touch inputs provided by user.

A plurality of exemplary user-provided input touches is schematically illustrated in FIG. 5. A first input touch 91 is illustrated on the touch sensitive area 72 of the touch sensor 70 within the hand anchor 50. A second input touch 92 is illustrated on the touch sensitive screen 42 adjacent the first input touch 91. Third and fourth input touches 93, 94 are also illustrated at a lower portion of the touch sensitive screen 42. The first, second, third, and fourth input touches 91, 92, 93, 94 may or may not be simultaneous. In the example shown, it is contemplated that either or both of the first and second input touches 91, 92 can be provided by a user's fingertip or thumb, and either or both of the third and fourth input touches 93, 94 can be provided by a user's wrist proximate the hand anchor 50.

It is contemplated that the controller 30 can be configured to determine an inadvertent touch adjacent a touch within the touch sensitive area 72. For example, the controller 30 can determine that the first input touch 91 within the touch sensitive area 72 is an intended or valid input touch from a user and that the second input touch 92 on the touch sensitive screen 42 is an invalid or inadvertent touch. The controller 30 can also be configured to remove, discard, or otherwise filter out the determined invalid or inadvertent second input touch 92.

It is further contemplated that the controller 30 can be configured to determine an inadvertent touch on a portion of the touch sensitive screen 42 opposite a touch determined in the touch sensitive area 72 of the touch sensor 70. For example, the controller 30 can determine that the first input touch 91 is a valid input touch. The third input touch 91 is located on an opposite side of the touch sensitive screen 42 from the first input touch 91, and the controller 30 can determine that the third input touch 91 is invalid based on its location relative to the first input touch 91.

In still another example, the controller 30 can determine that an input touch is invalid or inadvertent based on a physical size of the input touch over the touch sensitive screen 42 or the touch sensor 70. For instance, either or both of the third and fourth input touches 93, 94 can be deemed invalid or inadvertent by the controller 30 in an example where a user's wrist accidentally contacts the touch sensitive screen 42 while entering valid first and second input touches 91, 92.

Figure 6:
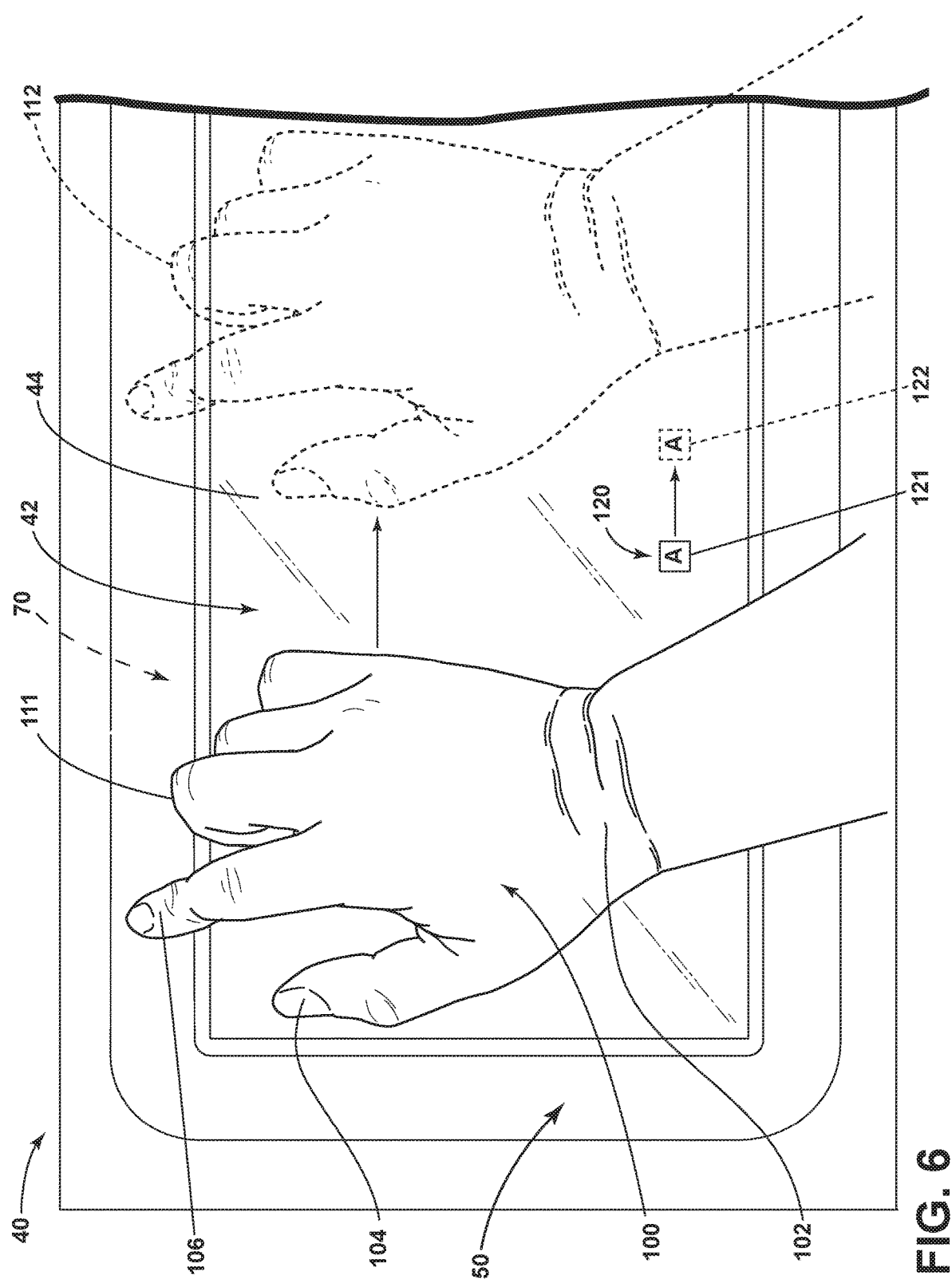
FIG. 6 is a schematic view of a user providing input touches on the touch screen display assembly of FIG. 2 according to various aspects described herein.

One example of user-provided gestures is schematically illustrated in FIG. 6. In this example, a user's hand 100 is shown including a wrist 102, thumb 104, and fingertip 106. In one example, the user's fingertip 106 can be in contact with the touch sensor 70 along the rear surface 60 of the channel 52 (FIG. 3), while the user's thumb 104 and wrist 102 do not contact the touch sensitive screen 42. In another example, the user's fingertip 106 can "hover over" the touch sensor 70, in other words being positioned sufficiently close e.g. 2 cm or less to the touch sensor 70, to generate the signal 73 (FIG. 4).

The user's hand 100 is shown moving between a first position 111 and a second position 112, and the user's fingertip 106 moves across at least a portion of the touch sensor 70 accordingly. The capacitive array 76 (FIG. 3) can be configured to output a signal, such as the signal 73 (FIG. 4), based on a gesture made along at least a portion of the capacitive array 76. The signal 73 can then be received by the recognition module 82 (FIG. 3), where the recognition module can determine that the gesture is a swiping gesture made along the touch sensor 70. The controller 30 (FIG. 4) can be configured to scroll or swipe a display on the touch sensitive screen 42 based on the signal 73. As illustrated, an exemplary display element 120 is shown scrolling between a first screen position 121 and a second screen position 122 corresponding with the gesture performed by the user's fingertip 106 on the touch sensor 70. It will be understood that other display elements on the screen can move, change, or otherwise be interacted with based on a variety of gestures performed on the touch sensor 70 or the touch sensitive screen 42, including an entire screen display or a selected portion of a screen display. Such gestures can include tapping, double-tapping, pressing, long-pressing, pressing with a variable pressure exerted on the screen surface 44, swiping slowly, swiping quickly, and the like, or combinations thereof. Such gestures can also include input from multiple fingers, such as a double-fingertip tap or swipe, a triple-fingertip tap or swipe, pinch-to-zoom, and the like. It is further contemplated that a combination of input touches or gestures can be performed on both the touch sensor 70 and the touch sensitive screen 42, such as holding the thumb 104 on the touch sensitive screen 42 while swiping with the fingertip 106 over at least a portion of the touch sensor 70.

It is also contemplated that the controller 30 can be configured to determine or distinguish between a gesture and an inadvertent touch on either or both of the touch sensor 70 and the touch sensitive screen 42. For instance, a gesture can be determined based upon a predetermined set of movements, such as moving at a constant speed between two points separated by less than 10 cm or pressing and holding on a particular location of the touch sensor 70 in non-limiting examples. An inadvertent touch can be determined based upon movements not associated with the predetermined set of movements, such as moving with constantly-varying speed between two points as might occur during turbulent motion of the aircraft. It is further contemplated that such a predetermined set of movements can be updated or customized periodically, such as including customized gestures for a first user e.g. three-finger-contact swiping and customized gestures for a second user e.g. three-finger-hover swiping.

In another example, the turbulence detector 28 can output a signal to the controller 30 that indicates turbulent conditions are above a predetermined threshold level. In such a case, a user's hand is likely to undergo increased unintended motion when interacting with the touch screen display assembly 40. The controller 30 can increase a sensitivity of inadvertent touch determination based on the signal from the turbulence detector 28. For example, the third input touch 93 and fourth input touch 94 can represent an inadvertent touch from the user's wrist 102 during periods of high turbulence and low turbulence, respectively. The controller 30 can sense, detect, or incorporate a difference in size of the input touch or gesture over the touch sensitive screen 42 or touch sensor 70 based on its sensitivity of inadvertent touch determination. In a non-limiting example, "sensitivity" can refer to a likelihood of the controller 30 determining that a given input touch is inadvertent, where "increased sensitivity" refers to an increased likelihood of such determination. In another non-limiting example, "sensitivity" can refer to a physical size or area of the touch sensitive screen 42 or the touch sensor 70 proximate a given input touch that the controller 30 evaluates for determining an inadvertent touch. In such a case, "increased sensitivity" can refer to the controller 30 evaluating an increased physical size or area proximate the given input touch.

In still another example, the controller 30 can have an increased sensitivity for determining inadvertent touch during predetermined flight portions of the aircraft 10, such as during take-off or landing. It can be appreciated that a user's hand is more likely to undergo unintended motion during interaction with the touch screen display assembly 40 during take-off or landing.

Figure 7:
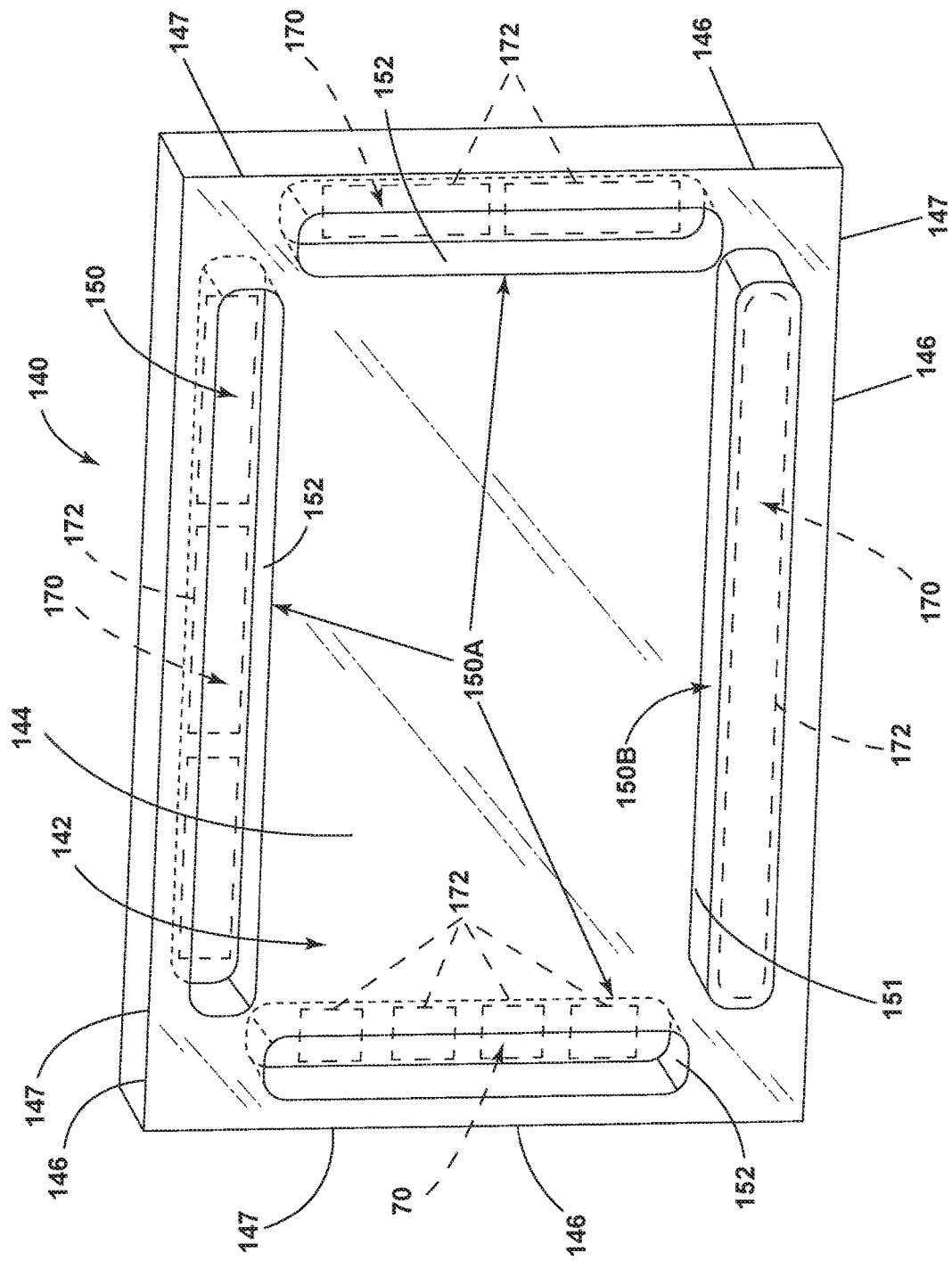
FIG. 7 is a perspective view of another touch screen display assembly according to various aspects described herein that can be utilized in the cockpit of FIG. 1.

FIG. 7 illustrates another touch screen display assembly 140 that can be utilized in the aircraft 10. The touch screen display assembly 140 is similar to the touch screen display assembly 40; therefore, like parts will be identified with like numerals increased by 100, with it being understood that the description of the like parts of the touch screen display assembly 40 applies to the touch screen display assembly 140, except where noted.

The touch screen display assembly 140 can include a touch sensitive screen 142 having a screen surface 144 and a periphery 146. One difference is that the periphery 146 is defined by an outer edge 147 of the touch screen display assembly 140. In the example shown, the entire touch sensitive screen 142 can be responsive to input touches. In another example (not shown) it is also contemplated that a portion less than the entirety of the touch sensitive screen 142 can be responsive to input touches, and that the screen surface 144 can overlie both responsive and non-responsive portions of the touch sensitive screen 142.

At least one hand anchor 150 can be included in the touch screen display assembly 140. One difference is that the at least one hand anchor 150 can include multiple hand anchors 150 spaced about the periphery 146 of the touch sensitive screen 142. Another difference is that a first set 150A of hand anchors 150 can be formed as a channel 152 within the screen surface 144, while a second set 150B of hand anchors 150 can be formed as a raised lip 151.

A plurality of touch sensors 170 can be located on or within the first or second sets 150A, 150B of hand anchors 150. The plurality of touch sensors 170 can have a corresponding plurality of touch sensitive areas 172. In the example shown, each hand anchor 150 includes multiple touch sensitive areas 172. It is also contemplated that each hand anchor 150 can include a single touch sensitive area 172 covering a portion or all of the hand anchor 150.

The above described aspects provide for a method of operating a vehicle, such as the aircraft 10, having a touch screen display such as the touch sensitive screen 42, 142. The method can include outputting from a touch sensor, such as the touch sensor 70, 170, a signal 73 indicative of a touch on a hand anchor 50, 150 located adjacent a touch screen surface such as the screen surface 44, 144. The method can also include detecting an input touch on the touch screen display and determining that the input touch is invalid based on the signal 73 indicative of the touch on the hand anchor 50, 150 located adjacent the touch screen surface. The method can further include controlling operation of the touch screen display based on the determining.

It is also contemplated that the method can include filtering out the invalid input touch, such as determining an inadvertent touch via the controller 30 and filtering, discarding, or otherwise not implementing an instruction from the inadvertent touch for the touch sensitive screen. In addition, the method can include detecting movement indicative of turbulence, wherein the controller 30 further controls operation of the touch screen display based on the movement indicative of turbulence as described above. It can be appreciated that the vehicle, such as the aircraft 10, can be operated based on validated input touches on the touch screen display assembly 40. It can be further appreciated that the above described aspects also provide for a method of updating a touch screen display in a vehicle, such as the touch sensitive screen 42 in the aircraft 10.

Aspects of the present disclosure provide for a variety of benefits including allowing a user to secure their hand in vibration environments while still interacting accurately with the touchscreen, which increases the usability of the touchscreen. Inclusion of a touch sensor in the hand anchor provides for allowed or validated input touches in the vicinity of the user's hand while removing, filtering, or otherwise ignoring invalid input touches elsewhere on the touch sensitive display. In addition, the adjustment of inadvertent touch sensitivity for different flight conditions can provide for improve usability or accuracy of interaction with the touch sensitive display. In an example where slot-type hand anchors have generated inadvertent or invalid input touch events at the edge of a display (e.g. from a user's palm), the inclusion of a touch sensor within the hand anchor as described herein provides for such undesired input touches to be filtered out or ignored.

In addition, where turbulent conditions or certain portions of flight (e.g. take-off of landing) can make scrolling on a touch screen difficult, the hand anchor and touch sensor described herein can provide for improved performance for scrolling. The above described aspects can mitigate the effects of turbulent environmental motions on inputs into the touch sensitive display.

Further aspects of the invention are provided by the subject matter of the following clauses:

1. A touch screen display assembly, comprising a touch sensitive screen having a screen surface, at least one hand anchor located adjacent the screen surface and wherein the at least one hand anchor is configured to form a stabilizing feature when a user interacts with the touch sensitive screen, a touch sensor operably coupled to the at least one hand anchor and forming a touch sensitive area within at least a portion of the at least one hand anchor, the touch sensor includes a capacitive sensor configured to output a signal based on a touch within the touch sensitive area, and a controller configured to receive the signal and operate the touch sensitive screen based thereon.

2. The touch screen display assembly of any preceding clause wherein the at least one hand anchor is located within a housing adjacent the touch sensitive screen.

3. The touch screen display assembly of any preceding clause wherein the hand anchor comprises a channel formed below a plane defined by the screen surface, the channel formed by spaced sidewalls defining an opening width and a rear surface defining a depth configured to accommodate at least a portion of a finger.

4. The touch screen display assembly of any preceding clause wherein the at least one hand anchor includes multiple hand anchors spaced about a periphery of the touch sensitive screen.

5. The touch screen display assembly of any preceding clause wherein the hand anchor comprises a single slot extending around a periphery of the touch sensitive screen and wherein the touch sensitive area extends along at least a portion of the periphery.

6. The touch screen display assembly of any preceding clause wherein the touch sensor comprises a capacitive array.

7. The touch screen display assembly of any preceding clause wherein the capacitive array is configured to output a signal based on a gesture made along the capacitive array.

8. The touch screen display assembly of any preceding clause wherein the controller is configured to one of scroll or swipe a display on the touch sensitive screen based on the signal from the capacitive array.

9. The touch screen display assembly of any preceding clause wherein the controller is further configured to receive input from the screen surface of the touch sensitive screen.

10. The touch screen display assembly of any preceding clause wherein the controller is further configured to determine an inadvertent touch adjacent a touch within the touch sensitive area or on a portion of the touch sensitive screen opposite the touch sensitive area.

11. The touch screen display assembly of any preceding clause, further comprising a sensor configured to output a signal indicative of turbulence and wherein the inadvertent touch determination has an increased sensitivity when turbulence is indicated.

12. The touch screen display assembly of any preceding clause wherein the inadvertent touch determination has an increased sensitivity during takeoff and landing.

13. The touch screen display assembly of any preceding clause, further comprising a display module configured to receive a signal from the touch sensitive screen based on a user touch on the touch sensitive screen.

14. The touch screen display assembly of any preceding clause, further comprising a recognition module communicatively connected to at least one of the display module or the touch sensor, wherein the recognition module is configured to determine a gesture on at least one of the touch sensitive area or the touch sensitive screen.

15. The touch screen display assembly of any preceding clause wherein the hand anchor includes an illuminable portion.

16. The touch screen display assembly of any preceding clause wherein the illuminable portion includes a light source disposed within the hand anchor.

17. A method of operating a vehicle having a touch screen display, the method comprising: outputting, from a touch sensor, a signal indicative of a touch on a hand anchor located adjacent a touch screen surface, detecting an input touch on the touch screen display, determining that the input touch is invalid based on the signal indicative of a touch on a hand anchor located adjacent a touch screen surface, and controlling operation of the touch screen display based on the determining.

18. The method of any preceding clause, further comprising filtering out the invalid input touch.

19. The method of any preceding clause, further comprising detecting movement indicative of turbulence and wherein a controller further controls operation of the touch screen display based on the movement indicative of turbulence.

20. The method of any preceding clause wherein the vehicle includes an aircraft having a cockpit with a flight deck.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A touch screen display assembly, comprising:
   a touch sensitive screen having a screen surface;
   at least one hand anchor located adjacent the screen surface and wherein the at least one hand anchor is configured to form a stabilizing feature when a user interacts with the touch sensitive screen;
   a touch sensor operably coupled to the at least one hand anchor and forming a touch sensitive area within at least a portion of the at least one hand anchor, the touch sensor includes a capacitive sensor configured to output a signal based on a touch within the touch sensitive area;
   a controller configured to receive the signal and operate the touch sensitive screen based thereon, the controller configured to determine an inadvertent touch adjacent a touch within at least one of the touch sensitive area, and a portion of the touch sensitive screen opposite the touch sensitive area; and
   a sensor configured to output a signal indicative of turbulence;
   wherein the controller configured to increase a likelihood of inadvertent touch determination based on the signal indicative of turbulence.

2. The touch screen display assembly of claim 1 wherein the at least one hand anchor is located within a housing adjacent the touch sensitive screen.

3. The touch screen display assembly of claim 1 wherein the hand anchor comprises a channel formed below a plane defined by the screen surface, the channel formed by spaced sidewalls defining an opening width and a rear surface defining a depth configured to accommodate at least a portion of a finger.

4. The touch screen display assembly of claim 1 wherein the at least one hand anchor includes multiple hand anchors spaced about a periphery of the touch sensitive screen.

5. The touch screen display assembly of claim 1 wherein the hand anchor comprises a single slot extending around a periphery of the touch sensitive screen and wherein the touch sensitive area extends along at least a portion of the periphery.

6. The touch screen display assembly of claim 1 wherein the touch sensor comprises a capacitive array.

7. The touch screen display assembly of claim 6 wherein the capacitive array is configured to output a signal based on a gesture made along the capacitive array.

8. The touch screen display assembly of claim 7 wherein the controller is configured to one of scroll or swipe a display on the touch sensitive screen based on the signal from the capacitive array.

9. The touch screen display assembly of claim 1 wherein the controller is further configured to receive input from the screen surface of the touch sensitive screen.

10. The touch screen display assembly of claim 9 wherein the controller is further configured to determine an inadvertent touch adjacent a touch within the touch sensitive area or on a portion of the touch sensitive screen opposite the touch sensitive area.

11. The touch screen display assembly of claim 10 wherein the inadvertent touch determination has an increased sensitivity during takeoff and landing.

12. The touch screen display assembly of claim 1, further comprising a display module configured to receive a signal from the touch sensitive screen based on a user touch on the touch sensitive screen.

13. The touch screen display assembly of claim 12, further comprising a recognition module communicatively connected to at least one of the display module or the touch sensor, wherein the recognition module is configured to determine a gesture on at least one of the touch sensitive area or the touch sensitive screen.

14. The touch screen display assembly of claim 1 wherein the hand anchor includes an illuminable portion.

15. The touch screen display assembly of claim 14 wherein the illuminable portion includes a light source disposed within the hand anchor.

16. A method of operating a vehicle having a touch screen display, the method comprising:

outputting, from a touch sensor, a signal indicative of a touch on a hand anchor located adjacent a touch screen surface;

detecting an input touch on the touch screen display;

determining that the input touch is invalid based on the signal indicative of a touch on a hand anchor located adjacent a touch screen surface;

controlling operation of the touch screen display with a controller based on the determining;

detecting movement indicative of turbulence; and controlling operation of the touch screen display with the controller based on the movement indicative of turbulence, wherein the controller configured to increase a likelihood of inadvertent touch determination based on the detected movement indicative of turbulence.

17. The method of claim 16, further comprising filtering out the invalid input touch.

18. The method of claim 16 wherein the vehicle includes an aircraft having a cockpit with a flight deck.

19. The touch screen display assembly of claim 1 wherein the controller is further configured to filter out the determined inadvertent touch.

\* \* \* \* \*